United States Patent [19]

Yamakawa et al.

[11] 4,114,569
[45] Sep. 19, 1978

[54] INTERNAL COMBUSTION ENGINE WITH AN AUXILIARY COMBUSTION CHAMBER

[75] Inventors: Yoshio Yamakawa, Toyota; Hiromichi Yanagihara; Nobuhiro Miura, both of Susono, all of Japan

[73] Assignee: Toyota Jidosha Kogyo Kabushiki Kaisha, Toyota, Japan

[21] Appl. No.: 802,909

[22] Filed: Jun. 2, 1977

[30] Foreign Application Priority Data

Apr. 6, 1977 [JP] Japan .................. 52-38492

[51] Int. Cl.$^2$ .............. F02B 19/08; F02B 17/00
[52] U.S. Cl. ................ 123/30 D; 123/32 SP; 123/191 S
[58] Field of Search ............. 123/30 C, 30 D, 32 C, 123/32 K, 32 L, 32 ST, 32 SP, 33 D, 191 S, 191 SP

[56] References Cited

U.S. PATENT DOCUMENTS

| 2,808,036 | 10/1957 | von Seggern et al. | 123/32 SP |
| 3,754,535 | 8/1973 | Hofbauer | 123/32 SP X |
| 4,038,959 | 8/1977 | Takizawa et al. | 123/191 S |

FOREIGN PATENT DOCUMENTS

| 986,326 | 7/1951 | France | 123/32 SP |
| 645,221 | 10/1950 | United Kingdom | 123/32 C |

Primary Examiner—Charles J. Myhre
Assistant Examiner—Tony M. Argenbright
Attorney, Agent, or Firm—Stevens, Davis, Miller & Mosher

[57] ABSTRACT

Disclosed is an internal combustion engine comprising a main chamber and an auxiliary chamber which are interconnected with each other via a connecting passage. An annular raised portion is formed on the inner wall of the auxiliary chamber, and the auxiliary chamber is divided into a first auxiliary chamber and a second auxiliary chamber by the annular raised portion so that the second auxiliary chamber has a volume of 20 through 40 percent relative to the volume of the first auxiliary chamber. The connecting passage is tangentially connected to the inner wall of the second auxiliary chamber. The nozzle of a fuel injector is disposed in the auxiliary chamber and is directed to the recess which is formed in the second auxiliary chamber beneath the annular raised portion at a position located opposite to the inner wall to which the connecting passage is tangentially connected with respect to the axis of the auxiliary chamber so that 30 through 40 percent of the total fuel injected from the injector is fed into the first auxiliary chamber, and the remaining 60 through 70 percent of the fuel is fed into the second auxiliary chamber. The spark gap of a spark plug is located in the recess of the second auxiliary chamber.

5 Claims, 4 Drawing Figures

INTERNAL COMBUSTION ENGINE WITH AN AUXILIARY COMBUSTION CHAMBER

DESCRIPTION OF THE INVENTION

The present invention relates to an internal combustion engine provided with an auxiliary chamber.

There has been proposed an internal combustion engine comprising a main chamber and an auxiliary chamber which are interconnected with each other via a connecting passage. In this engine, the auxiliary chamber has a volume of approximately 80 percent relative to the total volume of the combustion chamber and is divided into a first auxiliary chamber and a second auxiliary chamber by an annular raised portion defining a circular restricted opening. The connecting passage is tangentially connected to the inner wall of the second auxiliary chamber located at a position near the main chamber. A recess is formed on the inner wall of the second auxiliary chamber beneath the annular raised portion at a position located opposite to the inner wall to which the connecting passage is tangentially connected with respect to the axis of the auxiliary chamber. The spark gap of a spark plug is located in the vicinity of the recess. The fuel injector is disposed in the auxiliary chamber so as to form a rich air-fuel mixture in the recess. In operation, at the time of the intake stroke, a suction gas such as an air or a lean air-fuel mixture, or a suction gas containing a recirculated exhaust gas therein is introduced into the main chamber. Then, at the time of the compression stroke, the suction gas is forced into the auxiliary chamber via the connecting passage. As mentioned above, since the connecting passage is tangentially connected to the inner wall of the second auxiliary chamber, the suction gas causes a swirl motion in the auxiliary chamber. Then, fuel is injected from the fuel injector towards the swirling suction gas and, as a result, a rich air-fuel mixture is formed in the recess. After this, the rich air-fuel mixture thus formed is ignited by the spark plug and, then, the flame propagates into a lean air-fuel mixture formed in the first auxiliary chamber. As a result of this, the lean air-fuel mixture in the first auxiliary chamber is burned.

In an internal combustion engine of the above described this type, the amount of unburned HC components produced is considerably varied by changing the ratio of the volume of the first auxiliary chamber to the volume of the second auxiliary chamber, by changing the cross-sectional area of the restricted opening and by changing the injecting fuel spread angle while leaving the injecting direction directed towards the recess. In order to reduce the amount of unburned HC components produced, it is necessary to completely burn a lean air-fuel mixture in the first auxiliary chamber and to ensure ignition is caused in the recess of the second auxiliary chamber. That is, it is necessary to prevent a lean air-fuel mixture in the first auxiliary chamber from becoming excessively lean and a rich-fuel mixture in the recess of the second auxiliary chamber from becoming becomes excessively rich. The air-fuel ratio of a lean air-fuel mixture in the first auxiliary chamber and an air-fuel ratio of a rich air-fuel mixture in the recess of the second auxiliary chamber are considerably changed in accordance with the flow direction and the strength of the suction gas stream in the auxiliary chamber, and in accordance with the distributing ratio of fuel to the first auxiliary chamber and the second auxiliary chamber. In addition, the flow direction and the strength of the suction gas stream are greatly changed by the location of the restricted opening, that is, by the ratio of the volume of the first auxiliary chamber to the volume of the second auxiliary chamber. Consequently, in order to reduce the amount of unburned HC components produced, it is necessary to appropriately set both the ratio of the volume of the first auxiliary chamber to the volume of the second auxiliary chamber and the distributing ratio of fuel to the first auxiliary chamber and the second auxiliary chamber.

In addition, as a reason for unburned HC components being produced, there is a quench layer created on the inner wall of the first auxiliary chamber. However, the creation of this quench layer can be prevented by reducing the cross-sectional area of the restricted opening. That is, by reducing the cross-sectional area of the restricted opening, when the fuel injected towards the recess of the second auxiliary chamber enters into the first auxiliary chamber via the restricted opening, the fuel is collected in the central portion of the first auxiliary chamber and a layer consisting of air is formed on the inner wall of the first auxiliary chamber. However, the reduction of the cross-sectional area of the restricted opening has a great influence on the flow direction and the strength of the suction gas stream. Consequently, it is necessary to set the cross-sectional area of the restricted opening so that fuel is collected in the central portion of the first auxiliary chamber without greatly influencing the creation of the suction gas stream in the auxiliary chamber.

An object of the present invention is to provide an internal combustion engine provided with an auxiliary chamber, which is capable of greatly reducing the amount of unburned HC components produced.

According to the present invention, there is provided an internal combustion engine comprising: a cylinder block having a cylinder bore therein; a cylinder head having a cavity therein and mounted on said cylinder block, said cavity having an inner wall which defines an auxiliary chamber with an axis; a piston reciprocally movable in said cylinder bore, said piston and said cylinder head forming a main chamber therebetween; an intake valve movably mounted on said cylinder head for leading gas into said main chamber; an exhaust valve movably mounted on said cylinder head for discharging exhaust gas into the atmosphere; an annular raised portion formed on the inner wall of said auxiliary chamber and defining a restricted opening of approximately circular shape, said annular raised portion dividing said auxiliary chamber into a first chamber of approximately spherical shape and a second chamber of an ellipsoid shape, which are arranged in tandem along the axis of said auxiliary chamber, and forming a recess in said second chamber beneath said annular raised portion, the volume of said second chamber being in the range of 20 through 40 percent relative to the volume of the first chamber; a connecting passage formed in said cylinder head and communicating said main chamber with said auxiliary chamber, said connecting passage being arranged to be tangentially connected to the inner wall of said second chamber for creating a swirl motion of the gas at the time of the compression stroke; a fuel injector having an injecting nozzle disposed in said auxiliary chamber and directed to said recess located opposite to the inner wall to which said connecting passage is tangentially connected with respect to the axis of said auxiliary chamber for forming a rich air-fuel mixture in said recess, and; a spark plug having a spark gap located in said recess for igniting the rich air-fuel mixture therein.

The present invention may be more fully understood from the description of preferred embodiments of the invention set forth below, together with the accompanying drawings.

DESCRIPTION OF PREFERRED EMBODIMENTS

Figure 1:
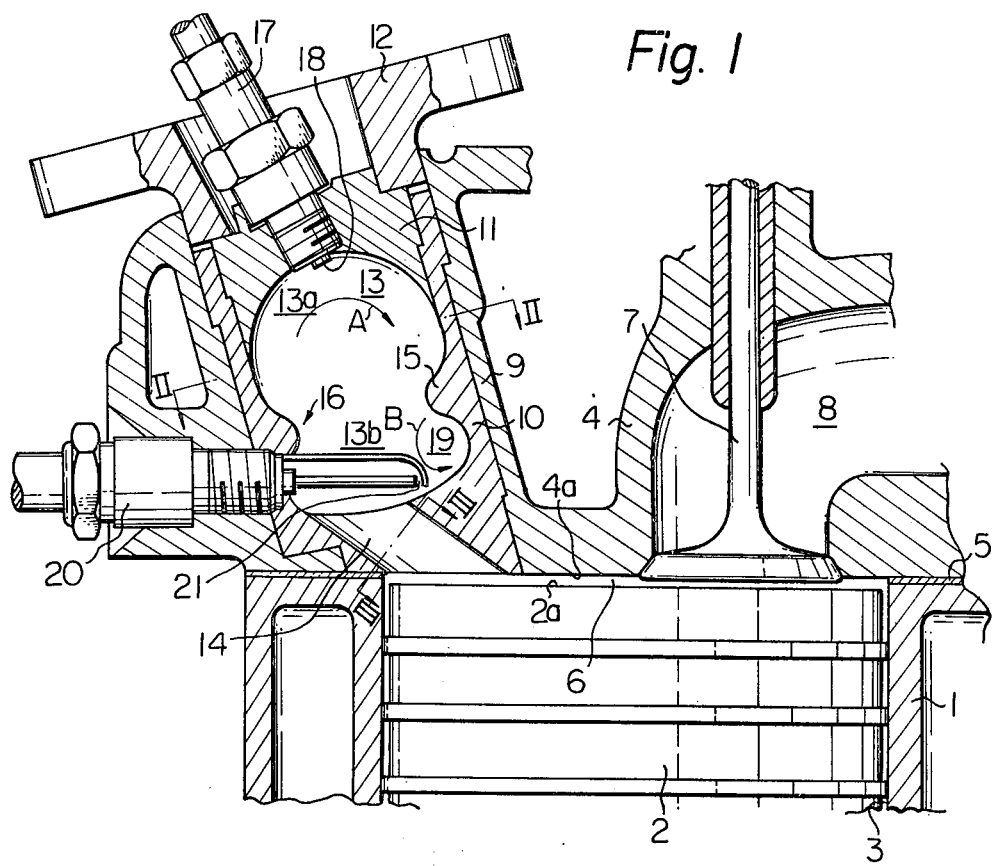
FIG. 1 is a cross-sectional side view of an embodiment of an internal combustion engine according to the present invention.
Figure 2:
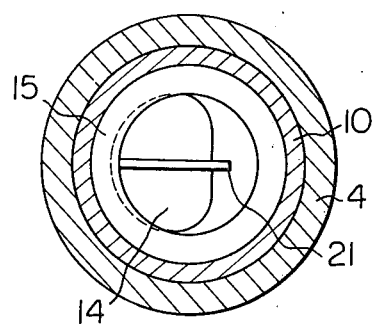
FIG. 2 is a cross-sectional view taken along the line II—II in FIG. 1.
Figure 3:
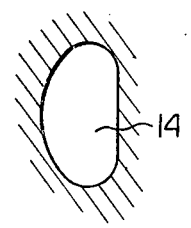
FIG. 3 is a cross-sectional view taken along the line III—III in FIG. 1.

Referring to FIG. 1, 1 designates a cylinder block, 2 a piston reciprocally movable in a cylinder bore 3 and having a flat top surface 2a, 4 a cylinder head fixed onto the cylinder block 1 via a gasket 5 and having a flat inner wall 4a, 6 a main chamber, 7 an intake valve, and 8 an intake port. In addition, an exhaust valve (not shown) is movably mounted on the cylinder head 4. A hole 9 having a circular cross-section is formed in the cylinder head 4, and an auxiliary chamber component 10 is fitted into the hole 9. Further, another auxiliary chamber component 11 is fitted into the upper portion of the auxiliary chamber component 10. The auxiliary chamber components 10 and 11 are rigidly fixed onto the cylinder head 4 by a fixing plate 12 fixed onto the cylinder head 4 by means of bolts (not shown). An auxiliary chamber 13 is formed in the auxiliary chamber components 10 and 11 and is connected to the main chamber 6 via a connecting passage 14 formed in the auxiliary chamber component 10. In addition, the sum of the volumes of the auxiliary chamber 13 and connecting passage 14 is set so as to be more than 80 percent relative to the sum of the volumes of the auxiliary chamber 13, the connecting passage 14 and the main chamber 6 at the time the piston 2 is positioned at the top dead center as shown in FIG. 1.

Figure 4:
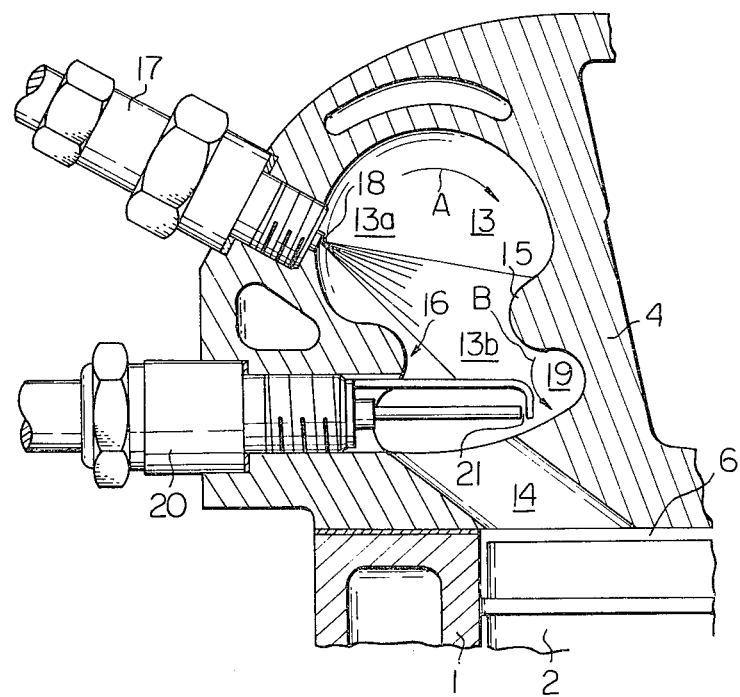
FIG. 4 is a cross-sectional side view of an alternative embodiment according to the present invention.

The shape of the inner wall of the auxiliary chamber 13 is formed in a surface of revolution, that is, a symmetrical surface around the axis of the auxiliary chamber 13. An annular raised portion 15 presenting a smoothly curved line in a longitudinal cross-section as shown in FIG. 1 is formed on the inner wall of the auxiliary chamber 13 and defines a circular restricted opening 16. However, it is not necessary to always form the restricted opening 16 in a circular shape. The cross-sectional shape of the restricted opening 16 may be formed in an ellipse instead of forming the restricted opening 16 in a circular shape. The auxiliary chamber 13 is divided into the first auxiliary chamber 13a and the second auxiliary chamber 13b by the annular raised portion 15, and this annular raised portion 15 is arranged so that the volume of the second auxiliary chamber 13b is in the range of 20 through 40 percent relative to the volume of the first auxiliary chamber 13a. In addition, the restricted opening 16 is set so as to have a cross-sectional area of 35 through 50 percent relative to the maximum cross-sectional area of the first auxiliary chamber 13a. The shape of the inner wall of the first auxiliary chamber 13a is spherical or approximately ellipsoid. On the other hand, the shape of the inner wall of the second auxiliary chamber 13b ellipsoid. The upper end of the connecting passage 14 is tangentially connected to the inner wall of the second auxiliary chamber 13b, while the lower end of the connecting passage 14 opens into the periphery of the main chamber 6. A nozzle 18 of a fuel injector 17 is disposed at the apex of the first auxiliary chamber 13a and is arranged to be directed to a recess 19 which is formed on the inner wall of the secondary auxiliary chamber 13b beneath the annular raised portion 15 at a position located opposite to the inner wall to which the connecting passage 14 is tangentially connected with respect to the axis of the auxiliary chamber 13. In addition, the nozzle 18 of the fuel injector 17 is arranged to distribute the fuel injected from the injector 17 to the first auxiliary chamber 13a and the second auxiliary chamber 13b, so that 30 through 40 percent of the total fuel injected from the injector 17 is fed into the first auxiliary chamber 13a, while the remaining 60 through 70 percent of the fuel is fed into the second auxiliary chamber 13b. It is not necessary to always position the nozzle 18 at the apex of the first auxiliary chamber 13a as shown in FIG. 1. The nozzle 18 may be arranged on the side wall of the first auxiliary chamber 13a as shown in FIG. 4 instead of positioning the nozzle 18 at the apex. However, in this case, the nozzle 18 of the fuel injector 17 is directed to the recess 19 so that 30 through 40 percent of the total fuel injected from the injector 17 is fed into the first auxiliary chamber 13a, while the remaining 60 through 70 percent of the fuel is fed into the second auxiliary chamber 13b. As is shown in FIGS. 1 and 4, a spark gap 21 of a spark plug 20 is located in the recess 19 in the vicinity of the opening of the connecting passage 14. Since the engines shown in FIGS. 1 and 4 are provided with no throttle valve in the intake port 8, the intake port 8 is directly connected to an air cleaner (not shown) or is connected to the air cleaner via a carburetor (not shown) forming a lean air-fuel mixture and having no throttle valve. Therefore, in these engines, the regulation of the load of the engine is carried out by regulating the amount of fuel injected from the fuel injector 17. In addition, the exhaust gas may be recirculated into the intake port 8.

In operation, at the time of the intake stroke, a suction gas such as air or a lean air-fuel mixture, or a suction gas containing a recirculated exhaust gas therein is introduced into the main chamber 6 via the intake valve 7. Then, at the time of the compression stroke, the suction gas introduced into the main chamber 6 is forced into the auxiliary chamber 13 via the connecting passage 14. The suction gas introduced into the auxiliary chamber 13 passes through the second auxiliary chamber 13b and enters into the first auxiliary chamber 13a, thus causing a strong swirl motion shown by the arrow A in the first auxiliary chamber 13a. On the other hand, a swirl motion as shown by the arrows B is caused in the recess 19 by the strong swirl motion A. The fuel injecting operation of the fuel injection 17 is started when the piston reaches approximately bottom dead center at the beginning of the compression stroke, and said fuel injecting operation is completed when the piston reaches a point corresponding to an approximately 120° before top dead center. When the fuel is injected from the fuel injector 17, 60 through 70 percent of the total fuel injected from the fuel injector 17 remains in the recess 19, and the remainder of the fuel enters into the first auxiliary chamber 13a via the second auxiliary chamber 13b. After this, a part of the fuel introduced into the first auxiliary chamber 13a is again returned to the second auxiliary chamber 13b. As stated previously, a swirl motion B is created in the recess 19. Consequently, the vaporization of the liquid fuel adhering onto the inner wall of the recess 19 is promoted by the swirl motion B and by the heat of the inner wall of the recess 19, and as a result, a rich air-fuel mixture is formed in the recess 19. Then, the rich air-fuel mixture formed in the recess 19 is ignited by the spark plug 20. A part of the flame of the rich air-fuel mixture thus ignited is injected into the main chamber 6 via the connecting passage 14, while the remaining large part of the flame propagates into the first auxiliary chamber 13a via the restricted opening 16. While an extremely lean air-fuel mixture is formed in the first auxiliary chamber 13a, the flame propagating into the first auxiliary chamber 13a swirls in the first auxiliary chamber 13a together with the strong swirl motion A created in the first auxiliary chamber 13a and, as a result, the lean air-fuel mixture in the first auxiliary chamber 13a is rapidly and almost completely burned.

As stated previously, in an engine according to the present invention, the second auxiliary chamber 13b is set so as to have a volume of 20 through 40 percent relative to the volume of the first auxiliary chamber 13a, and the restricted opening 16 is set so as to have a cross-sectional area of 35 through 50 percent relative to the maximum cross-sectional area of the first auxiliary chamber 13a. According to the experiments conducted by the inventor, by setting the volume of the second auxiliary chamber 13b and the cross-sectional area of the restricted opening 16 within the above-mentioned percentages, it has been proven that the gas in the first auxiliary chamber 13a is stratified so that the fuel is collected in the central portion of the first auxiliary chamber 13a and a layer consisting of air is formed on the inner wall of the auxiliary chamber 13, thereby preventing the creation of a quench layer. In addition, it has also been proven that an appropriate swirl motion is created in the recess 19 of the second auxiliary chamber 13b and, as a result, a rich air-fuel mixture of an optimum air-fuel ratio is formed in the recess 19, whereby carbon particles are not caused to adhere onto the electrode of the spark plug 20.

In addition, by setting the fuel distributing ratio to the first auxiliary chamber 13a and the second auxiliary chamber 13b at approximately 1:2, it has been proven that the ratio of the air-fuel ratio of mixture in the first auxiliary chamber 13a to the air-fuel ratio of the mixture in the second auxiliary chamber 13b is maintained constant and, thus, a stable distribution of the air-fuel ratio of the mixture in the auxiliary chamber can be obtained.

According to the present invention, the creation of the quench layer consisting of unburned components can be prevented and a rich air-fuel mixture of an optimum air-fuel ratio can be formed in the recess of the second auxiliary chamber. In addition, a stable combustion can be obtained. As a result of this, the amount of unburned HC components produced can be greatly reduced.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head having a cavity therein and mounted on said cylinder block, said cavity having an inner wall which defines an auxiliary chamber with an axis;
   a piston reciprocally movable in said cylinder bore, said piston and said cylinder head forming a main chamber therebetween;
   an intake valve movably mounted on said cylinder head for leading gas into said main chamber;
   an exhaust valve movably mounted on said cylinder head for discharging exhaust gas into the atmosphere;
   an annular raised portion formed on the inner wall of said auxiliary chamber and defining a restricted opening of an approximately circular shape, said annular raised portion dividing said auxiliary chamber into a first chamber of approximately spherical shape and a second chamber of an ellipsoid shape which are arranged in tandem along the axis of said auxiliary chamber, and forming a recess in said second chamber beneath said annular raised portion, the volume of said second chamber being in the range of 20 through 40 percent relative to the volume of the first chamber;
   a connecting passage formed in said cylinder head and communicating said main chamber with said auxiliary chamber, said connecting passage being arranged to be tangentially connected to the inner wall of said second chamber for creating a swirl motion of the gas at the time of the compression stroke;
   a fuel injector having an injecting nozzle disposed in said auxiliary chamber and directed to said recess located opposite to the inner wall to which said connecting passage is tangentially connected with respect to the axis of said auxiliary chamber for forming a rich air-fuel mixture in said recess, and;
   a spark plug having a spark gap located in said recess for igniting the rich air-fuel mixture therein.

2. An internal combustion engine as claimed in claim 1, wherein the nozzle of said fuel injector is arranged to feed into said first chamber 30 through 40 percent of the total fuel injected from said fuel injector and to feed the remaining 60 through 70 percent of the fuel into said second chamber.

3. An internal combustion engine as claimed in claim 1, wherein the cross-sectional area of said restricted opening is in the range of 35 through 50 percent relative to the maximum cross-sectional area of said first chamber.

4. An internal combustion engine as claimed in claim 1, wherein the sum of the volumes of said auxiliary chamber and said connecting passage is more than 80 percent relative to the sum of the volumes of said auxiliary chamber, said connecting passage and said main chamber when the piston reaches the top dead center.

5. An internal combustion engine as claimed in claim 1, wherein the spark gap of said spark plug is located in the vicinity of an opening of said connecting passage.

* * * * *